United States Patent [19]

Morse

[11] Patent Number: 4,655,445

[45] Date of Patent: Apr. 7, 1987

[54] APPARATUS FOR POSITIONING A WORKPIECE WITH RESPECT TO A CUTTING ELEMENT

[76] Inventor: John B. Morse, 9 Durham St., Boston, Mass. 02115

[21] Appl. No.: 688,339

[22] Filed: Jan. 2, 1985

[51] Int. Cl.⁴ ................................................ B23Q 3/06

[52] U.S. Cl. ................................ 269/304; 144/198 A

[58] Field of Search .................. 144/198 A, 89, 90 R, 144/27, 145 R, 137; 269/287, 304

[56] References Cited

U.S. PATENT DOCUMENTS

| | | | |
|---|---|---|---|
| 2,616,459 | 11/1952 | Johnson | 144/198 A X |
| 2,777,485 | 1/1957 | Farrow | 144/198 A |
| 2,895,513 | 7/1959 | Cowley | 144/198 A X |
| 2,941,556 | 6/1960 | Hammerling | 144/198 A |
| 2,972,366 | 2/1961 | Caruso | 144/198 A |

FOREIGN PATENT DOCUMENTS

| | | | |
|---|---|---|---|
| 166021 | 4/1955 | Australia | 144/89 |
| 372645 | 10/1983 | Austria . | |
| 51929 | 5/1840 | Fed. Rep. of Germany . | |
| 208314 | 3/1909 | Fed. Rep. of Germany . | |
| 521899 | 3/1931 | Fed. Rep. of Germany . | |
| 1004363 | 3/1957 | Fed. Rep. of Germany . | |

*Primary Examiner*—Frederick R. Schmidt
*Assistant Examiner*—Steven P. Schad
*Attorney, Agent, or Firm*—Lahive & Cockfield

[57] ABSTRACT

An apparatus for selectively positioning a workpiece having a planar surface adjacent to a guide on a substantially planar work surface of a power tool assembly. The positioning apparatus is adapted to selectively position the workpiece to be at selected ones of a plurality of predetermined lateral offsets with respect to a cutting element. The positioning apparatus includes an indexing member having a plurality of index holes passing therethrough and an elongated index pin element extending along a pin axis. The indexing member is affixed to either the workpiece or the guide, and the pin element is affixed to the other of the workpiece or the guide, so that the workpiece may be positioned adjacent to the indexing member and the guide, with the pin element extending through and interferingly engaging one of the index holes, permitting the generation of a succession of cuts in a workpiece which are substantially uniformly spaced along a reference axis.

7 Claims, 6 Drawing Figures

APPARATUS FOR POSITIONING A WORKPIECE WITH RESPECT TO A CUTTING ELEMENT

BACKGROUND OF THE DISCLOSURE

The present invention is in the field of power tools, and is more particularly related to accessories for use with electrical motor driven tools.

It is common practice in tool configurations to include a substantially planar work surface for supporting a workpiece with respect to a cutting element. For example, a table saw includes a planar surface with an electrical motor driven circular saw blade adapted for rotary motion about an axis parallel to the work surface. As another example of a common power tool, a drill press typically includes a substantially planar work surface, and a cutting element adapted for rotary motion about an axis perpendicular to the work surface, with the bit also being selectively positionable along that axis. In such configurations, a workpiece may be positioned by hand with respect to the cutting element, and then the cutting element activated to achieve a desired cutting or tooling operation.

In many applications, it is desirable to perform a number of identical cutting operations at uniformly spaced locations on a workpiece. For example, a succession of uniformly spaced holes may be made in a workpiece, with the respective holes extending along a desired axis. As a further example, a finger joint, or box joint, may be made to join the ends of two workpieces made of wood, for example where cuts in the ends of the pieces define "fingers" in each end which are appropriately sized and positioned to permit interleaving. Typically, finger joints require precisely positioned and precisely dimensioned fingers.

In circumstances where such cutting operations are desired on a large scale, for example in a mass production manufacturing facility, special machine assemblies may economically be configured to accomplish the precision cutting operations. However, in the confines of a typical home work shop, for example, where economics permit only limited sophistication in the available tools, the complex and precise machining operations must be accomplished with relatively inexpensive equipment. Often specialized jigs may be assembled to be used in conjunction with a readily available and inexpensive tool.

In the prior art, finger joints, for example, may be made in the manner disclosed in the text "Tage Frid Teaches Woodworking", published by the Taunton Press, Inc., Newtown, Conn., 1979, pages 90–93. According to this prior art teaching, a finger joint may be made with a table saw having a dado head, where the workpiece is manually positioned so that each finger-defining cut is made individually, following a manual re-positioning of the workpiece. While that method does provide a succession of cuts which may be suitable for finger joints, the successful accomplishment of such a joint requires precisely located and dimensioned cuts which are extremely difficult to make with the relatively simple jig disclosed. That jig consists of a plywood member affixed to a miter gauge on the surface of a circular saw. The plywood member includes at its base a slot which is precisely matched to the desired finger width. A guide pin the width of the slot extends outwardly from that slot. Using the jig as a support for the workpiece, the first cut in the workpiece is made after positioning the workpiece one "finger width" from the pin. Thereafter, the remaining cuts are made after successively positioning the workpiece to overlie the guide pin, one finger at at time. However, with this configuration, any error in the spacing of the cuts, is cumulative, so that the resultant finger joint is highly likely to provide a relatively poor fit, and thus a poor finger joint.

It is an object of the present invention to provide an improved accessory apparatus for use with a power tool. Another object of the present invention is to provide an improved accessory for use with a power tool which permits the generation of a succession of cuts which are substantially uniformly spaced along a reference axis.

SUMMARY OF THE INVENTION

Briefly, the present invention provides an apparatus for selectively positioning a workpiece having a planar surface adjacent to a guide on a substantially planar work surface of a power tool assembly. The guide is adapted for linear relative motion along a reference axis with respect to the cutting element of the power tool, where the reference axis is parallel to the work surface. The positioning apparatus is adapted to selectively position the workpiece to be at selected ones of a plurality of predetermined lateral offsets with respect to the reference axis. By way of example, in the case of a table saw, the guide may be a conventional miter gauge which slides along the work surface of the saw relative to the fixed blade. A similar configuration may be used in the case of a router and associated router 1 table. Alternatively, the guide may be of fixed (for example by a clamp) to the planar work surface of a drill press, so that the workpiece may be indexed along an axis parallel to the work surface, while the cutting element may be movable along a linear reference axis perpendicular to the work surface.

Generally, the positioning apparatus includes an indexing member having a plurality of index holes passing therethrough. The index holes are disposed along an indexing axis with interhole separations along that axis corresponding to the predetermined lateral offsets. The positioning apparatus further includes an elongated index pin element extending along a pin axis. The pin element is adapted to fit through each of the index holes and to interferingly engage those holes.

The positioning apparatus further is adapted to affix the indexing member to either the workpiece or the guide, and to affix the pin element to the other of the workpiece or the guide. With this configuration, the workpiece may be positioned adjacent to the indexing member and the guide, with the workpiece having the principal plane of its planar surface angularly offset with respect to the work surface and with the pin element extending through and interferingly engaging one of the index holes.

In one particular form of the invention, the index holes are uniformly spaced along the index axis with an interhole spacing S. With the invention, a workpiece held adjacent to the guide may be successively moved to desired positions laterally offset from the cutting element, and at each of the positions, a cutting operation may be performed. Using a table saw, for example, where the desired positions of the workpiece are evenly spaced, a groove may be cut at each position so that precisely dimensioned and positioned fingers of a finger joint may be established.

In one form of the invention, the indexing member includes two planar sheet portions, each elongated in the direction of the indexing axis. The two planar sheet portions are offset by substantially ninety degrees and extend from a common axis parallel to the indexing axis. In this configuration, the index holes (which may be open-ended slots or alternatively, fully bounded holes) are in the first of the planar sheet portions. The second portion is adapted for fixture to the workpiece. The index pin element is adapted for fixture to the guide in this configuration, with the pin axis being angularly offset with respect to the work surface. Preferably, the pin axis is perpendicular to the plane of the work surface, but other offset angles may be used.

In this configuration, with the indexing holes being spaced apart uniformly by a distance S, the second portion of the indexing member includes a plurality of workpiece stop pin holes passing therethrough along axes perpendicular to the principal plane of the second portion, and where the stop pin holes are spaced apart by S/2 in the direction of the indexing axis. The stop pin holes are adapted to permit passage of a stop member therethrough.

In embodiments where n is greater than 1, the apparatus is further adapted for selectively providing a plurality of different spacings in the cuts in the workpiece. In such configurations, the apparatus may further include a template member adapted for releasable attachment to the indexing member.

Without the template member, the apparatus may be fully adapted, for example, to enable the cutting of a plurality of $\frac{1}{8}$ inch grooves, with $\frac{1}{8}$ inch intergroove spacing. With a template member, the apparatus may be adapted to enable the cutting of a plurality of $\frac{1}{4}$ inch grooves with $\frac{1}{4}$ inch spacing. This latter operation may be performed without the template member by merely using the alternate holes in the indexing member, but the template member affords an ease of use. Other templates may also be used, for example providing $\frac{3}{8}$ or $\frac{1}{2}$ inch spacing or any multiple of the basic ($\frac{1}{8}$ inch, in this example) intergroove spacing of the indexing member.

In one form, the template member has at least an elongated first portion extending along a template axis and has a plurality of template holes passing therethrough along the template axis. The template holes are uniformly spaced along the template axis with an interhole spacing of rS, where r is an integer. The template member is adapted so that the template axis is parallel to the indexing axis and the template holes overlie ones of the index holes when the template is attached to the first portion of the indexing member.

In one form of the invention, the template member further includes a second portion which is adapted to overly the second portion of the index member when the template member is attached to the index member. The second portion of the template member includes at least two stop pin holes passing therethrough and being adapted to overlie two holes of the set of the workpiece stop pin holes of the second portion of the indexing member which are spaced apart by rS/2.

In another form of the invention, the indexing member includes a single planar sheet element which is elongated in the direction of the indexing axis. The indexing member is adapted for fixture to the guide with the principal plane of the indexing member being perpendicular to the work surface. The index pin element is adapted for fixture to the workpiece with the pin axis being perpendicular to the principal plane of the workpiece. In one form, the index member is affixed to the guide by way of screw fasteners passing through mounting holes on the indexing member. The index pin element may be affixed to the workpiece by way of a clamp assembly having a planar element for supporting each side of the workpiece. In this case, the index pin element may be affixed to one of the clamp assembly elements so that the pin axis is perpendicular to the planar element.

In yet another form of the invention, the indexing member includes two overlapping planar sheet index portions which are elongated in a direction of the indexing axis. Each of those index portions includes a plurality of reference holes, with the reference holes of each portion being disposed along the indexing axis with interhole separations corresponding to the predetermined lateral separations. In this form, the index portions are biased in opposite directions along the indexing axis so that overlapping pairs of the referenced holes define the corresponding ones of the indexing holes.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
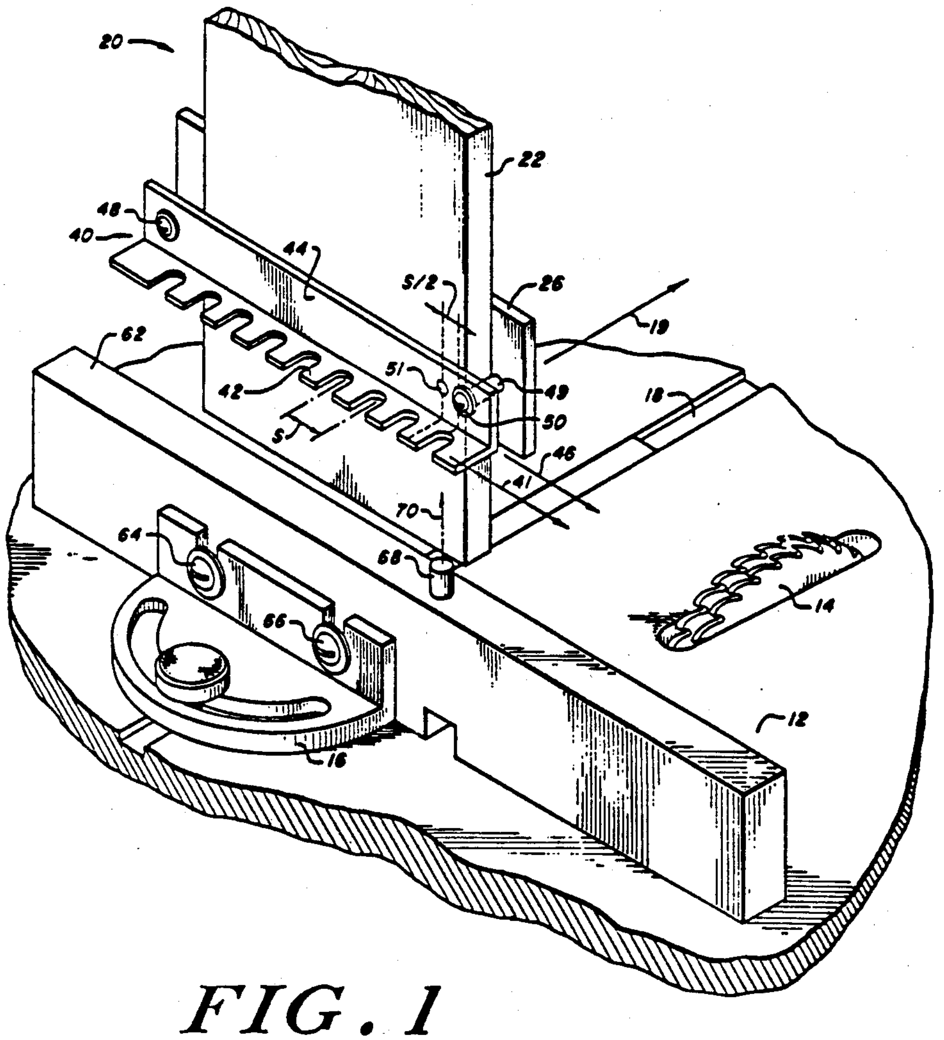
FIG. 1 shows in perspective view of an exemplary embodiment of the present invention.

FIG. 1 shows an embodiment for the present invention supporting a planar sheet-like workpiece 22 in position for cutting operations performed with a table saw. The table saw has a substantially planar work surface 12 and a dado head or blade 14 adapted for rotation about an axis substantially parallel to the surface 12. The table saw further includes, as an accessory, a miter gauge 16 which is adapted to slide in a slot 18 of surface 12 in the direction of a reference axis 19 substantially parallel to the surface 12. Thus, the miter gauge is movable along a reference axis 19 relative to the cutting element 14 of the saw.

The assembly 20 of FIG. 1 is adapted to position a workpiece 22 at selected ones of a plurality of predetermined lateral offsets with respect to the reference axis 19. That is, a workpiece 22 may be positioned with respect to blade 14 at a number of predetermined, uniformly spaced offsets with respect to the saw blade 14.

The assembly 20 generally includes an indexing member 40 having a plurality of index holes which are uniformly spaced with an interhole separation S along an indexing axis 41. The indexing member 40, as shown in FIG. 1, includes a first planar sheet portion 42 and a second planar sheet portion 44, which portions 42 and 44 are offset by substantially ninety degrees and extend from a common axis 46 which is substantially parallel to the indexing axis 41. The second portion 44 of indexing number 40 is adapted for rigid coupling to the workpiece 22.

The assembly 20 further includes elements adapted to affix (or clamp) the portion 44 of indexing number 40 to the planar surfaces of the workpiece 22. More particularly, a clamping assembly includes a back number 26, and bolt fasteners 48 and 50 adapted to sandwich the portion 44 and member 26 about the workpiece 22 in a manner firmly affixing portion 44 to a planar surface of the workpiece 22. With this configuration, the portion 44 includes a stop pin 49 extending its back side (as shown) along an axis parallel to axis 19. In this embodiment, the stop pin 49 is the bolt portion of the fastener 50. In alternative embodiments, a separate stop pin may be used. The stop pin 49 is adapted so that its leftmost (as shown) surface is aligned with the central axis of the rightmost (as shown) hole of the first portion 42 of indexing member 40. The stop pin offset, which controls the position of the first cut, may vary in other embodiments. The second portion 44 of index 40 includes a hole 51 which is offset in the direction of the indexing axis 41 with respect to the stop pin 49 by a distance S/2, thereby providing a pair of holes including hole 51 and the hole through which stop pin 49 extends in the portion 44 of the indexing 40.

The assembly 20 further includes a guide board 62 rigidly affixed to the miter gauge 16 by means of screw fasteners 64 and 66. Guide board 62 has an upper surface which is substantially parallel to surface 12, and includes an elongated index pin element 68 extending therefrom along a pin axis 70. The pin element 68 is adapted to fit through and interferingly engage each of the index holes of the portion 42 of indexing 40. In the present embodiment, axis 70 is perpendicular to surface 12, although in other embodiments, offsets differing from ninety degrees may be used.

With this configuration the workpiece 22 may be affixed within the clamp assembly formed by portion 44, member 26 and fasteners 48 and 50, so that the right-hand (as shown) edge of workpiece 22 is flush against the leftmost (as shown) portion of stop pin 49, and so that the indexing member 40 may be positioned so that the portion 42 overlies the upper surface of guide board 62 with the indexing pin 68 passing through one in the holes of portion 42 when the lower edge of the workpiece 22 is flush with the work surface 12. For example, with this configuration, as shown in FIG. 1, the pin 68 may pass through the rightmost hole in member 42 and a first finger cut may be made in the lower end of workpiece 22 by controlling the miter gauge 16 to move along axis 19 so that workpiece 22 passes the blade 14. Thereafter, the miter gauge 16 may be retacted and the workpiece and indexing member 40 lifted and shifted over one hole so that the pin element 68 passes through the second hole (as shown) from the right in the member 42, and the cutting process repeated. This shift and then cut process may be successively repeated for the remaining holes in the portion 42, or for the full width of the workpiece 22 to establish the finger cuts for one workpiece 22 for use in joining to a complimentary cut workpiece.

The complimentary workpiece may be made by first releasing workpiece 22 from the clamping assembly of assembly 20 and then inserting a pin (for example, a drill bit, or a dowel) through hole 51, and then inserting a second workpiece so that its rightmost edge is flush with the leftmost edge of the pin passing through hole 51. The workpiece may be then secured to the assembly 20 by the clamping action of bolts 48 and 50 and portion 44 and member 26. As a result, the second workpiece is shifted by a distance S/2 with respect to the first workpiece 22 which had been machined before. Following this set-up procedure, a succession of cuts may be made in the end of the second workpiece in the same manner described above for workpiece 22. As a consequence, the ends of the second workpiece and the previously cut workpiece 22 will have a complimentary set of finger cuts so that those end portions may be joined to form a finger joint, with precisely located and dimensioned fingers.

Figure 2:
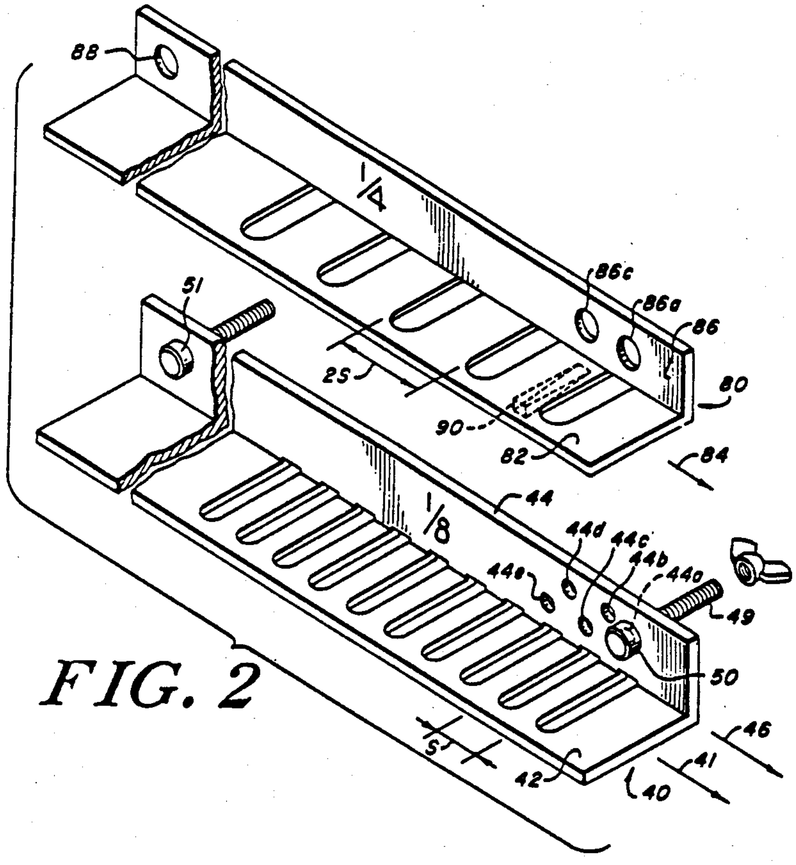
FIG. 2 shows in perspective view of an exemplary indexing member and template member of the present invention.

FIG. 2 shows an alternative embodiment for the indexing member 40 in which corresponding elements are marked with identical reference designations. In FIG. 2, the number of holes in portion 42 is substantially larger than the eight shown in FIG. 1. By way of example, these holes may be based on $\frac{1}{4}$ inch centers, that is $S=\frac{1}{4}$ inch. The portion 44 of indexing member 40 includes a plurality stop pin holes (in this case five holes denoted by reference designations *44a*, *44b*, *44c*, *44d* and *44e*) having an interhole spacing S/2 in the direction of indexing axis 41. In this case, a stop pin 49 (formed by the bolt portion of fastener 50, as in the embodiment of FIG. 1) passes through hole *44a*. In use, another stop pin is adapted for insertion in a selected one of the remaining holes *44b*, *44c*, *44d* and *44e*.

In general, there may be n stop pin holes passing through the portion 44 with the minimum interhole spacing S/2, where n is an integer greater than one. Each of these holes are adapted to permit passage of a stop pin therethrough which is displaced from stop pin 49 by a multiple of S/2, so that after a first workpiece is machined, a second workpiece may be similarly machined but with an offset corresponding to the distance between hole *44a* and the selected one of holes *44b*, *44c*, *44d* and *44e* holes through which the stop pin is inserted during the second machining operation. For the example where $S=\frac{1}{4}$ inch, holes *44b*, *44c*, *44d* and *44e* provide appropriate offsets for the fingers of the second workpiece (with respect to the fingers of the first workpiece) for finger widths of $\frac{1}{8}$, $\frac{1}{4}$, $\frac{3}{8}$ and $\frac{1}{2}$ inch respectively.

FIG. 2 also shows a template number 80 adapted for releasable attachment to the indexing member 40. Template 80 includes a first portion 82 extending along a template axis 84. Portion 82 has a succession of holes uniformly spaced along the template axis 84 with an interhole spacing of rS, where r is an integer, in the general case. In the illustrated embodiment of FIG. 2, where $S=\frac{1}{4}$ inch, r=2 and thus the interhole spacing in the template 80 on portion 82 is 2S or $\frac{1}{2}$ inch. The template 80 is adapted so that the template axis 84 is parallel to the indexing axis 41 and the template holes overlie a certain of the index holes in portion 42 when the template member is attached to the portion 42 of the indexing 40. In the illustrated embodiment, the template 80 further includes a portion 86 which is substantially perpendicular to portion 82 and includes two stop pin holes *86a* and *86c* passing therethrough, with holes *86a* being adapted to overlie hole *44a* (and being larger than the head of fastener 50), and hole *86c* being adapted to overlie one of holes *44b*, *44c*, *44d* and *44e* of the portion 44. Holes *86a* and *86c* are spaced apart by rS/2 or S where r=2 as in the present example, so that hole *86a* overlies hole *44a* and hole *86c* overlies hole *44c*. Another hole 88 is shown on the left side of template 80 to permit that template to lie flush against member 40. In the preferred form, hole 88 is elongated to accommodate expansion and contraction of member 40.

In FIG. 2, a retaining member 90 extending from the underside of template 80 is adapted to retain the template 80 with respect to the indexing member 40 with member 90 extending into the second index hole from the right (as shown) of the portion 42 of indexing member 40.

With the indexing member 40 of FIG. 2 positioned with respect to workpiece as shown and described in conjunction with FIG. 1, a set of workpieces may be adapted to provide finger joints with ⅛ inch fingers. Alternatively, the configuration may be adapted by affixing the template 80 to the indexing member 40, so that the rightmost holes of portions 42 and 82 respectively are aligned. As a result, the template 80 masks the alternate holes of indexing 40. By using the holes available to the user with the template 80 in place, the unmasked holes in indexing member 40 may be used so that workpieces may be machined to provide finger joints with ¼ inch finger dimensions. Without the template member 80 in place, the indexing member 40 may be used to provide finger joints with ⅛ inch finger widths.

It will be understood that while the embodiment of FIG. 2 shows a configuration when the stop pin holes in member 40 and template 80 are shown on the right side, alternate embodiments may have similarly positioned holes on the left side, or yet other embodiments may have similarly positioned holes on both the left and right sides of those members 40 and 80.

Thus, with the above described configurations, the general assembly 20 may be adaptively used in conjunction with the template 80 to provide a versatile assembly for various finger dimensions. Similar template members 80 may be generated for differing size fingers of a finger joint. In practice, the element 40 may be made from aluminium (or rigid plastic), and the template member 80 may be a snap-on compliant plastic template, thereby permitting an economical package of accessories for use with a table saw to be manufactured.

It will be understood that the assembly 20 described above in conjunction with FIGS. 1 and 2 may be used in conjunction with other power tools, for example, with a drill press where the guide 62 may be rigidly attached to the work surface 12 of such a power tool, while the workpiece may be indexed along the guide 62 with indexing pin 68 passing through successive holes in member 40, and the cutting element of the drill press may at each successive repositioning be inserted into and retracted from the workpiece along an axis perpendicular to surface 12. Assembly 20 may be alternatively used in conjunction with other power tools, such as routers or milling machines, by way of example.

Figure 2A:
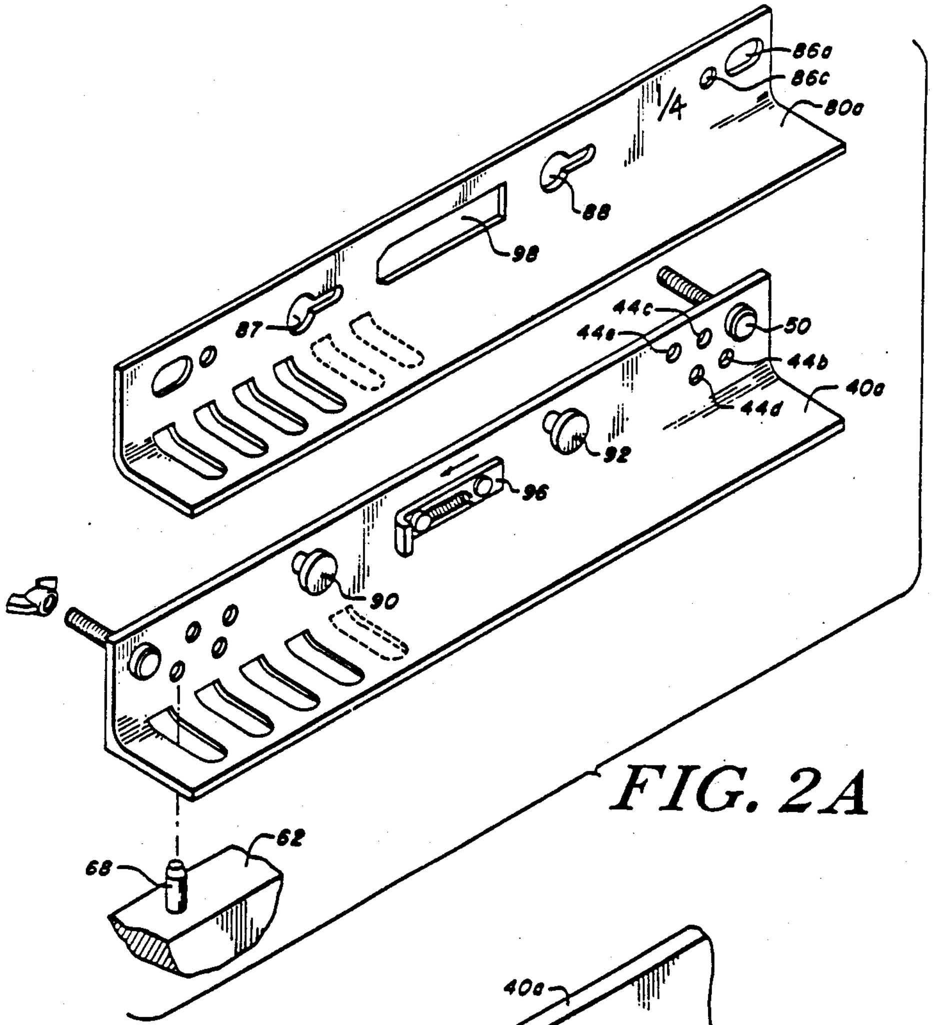
FIG. 2A and 2B show an alternative form of the indexing member and template member of the embodiment of FIG. 2.
Figure 2B:
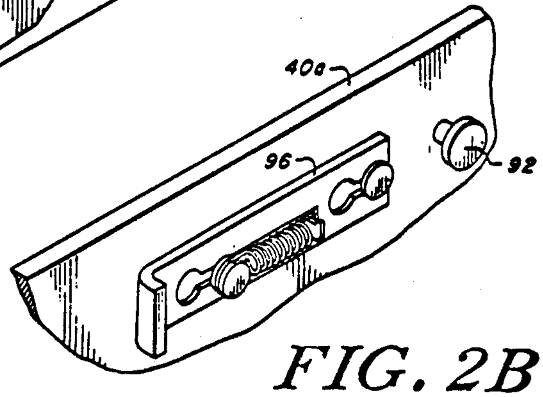

FIGS. 2A and 2B show another form of the indexing member and template of the embodiment of FIG. 2. In FIG. 2A, an indexing member 40*a* and a template member 80*a* are shown in which the template 80*a* is adapted to overlie member 40*a* where template 80*a* is positioned so that holes 87 and 88 are disposed about mounting studs 90 and 92, respectively, extending from member 40*a*. A slide member 96 on member 40*a* is spring-biased (as shown in detail in FIG. 2B) to engage a slot 98 of template 80*a* so that template 80*a* is releasably held in place against member 40*a*. The edges of the holes in the template 80*a* together with the edges of the holes in member 40*a* form the indexing holes, so that when used with a tapered pin 68 extending from guide 62, the pin 68 "self-locates" the indexing holes). With this spring-loaded template configuration, all slop or "play" is eliminated relative to the pin 68, and further, that pin 68 may be of any diameter which is smaller than the width of the guide slots of the member 40*a*. The template 80*a* is thus coupled by the spring clamp and guide so that it is spring loaded against both sides of the pin 68 (which may be tapered), permitting the making of highly accurate cuts.

Figure 3:
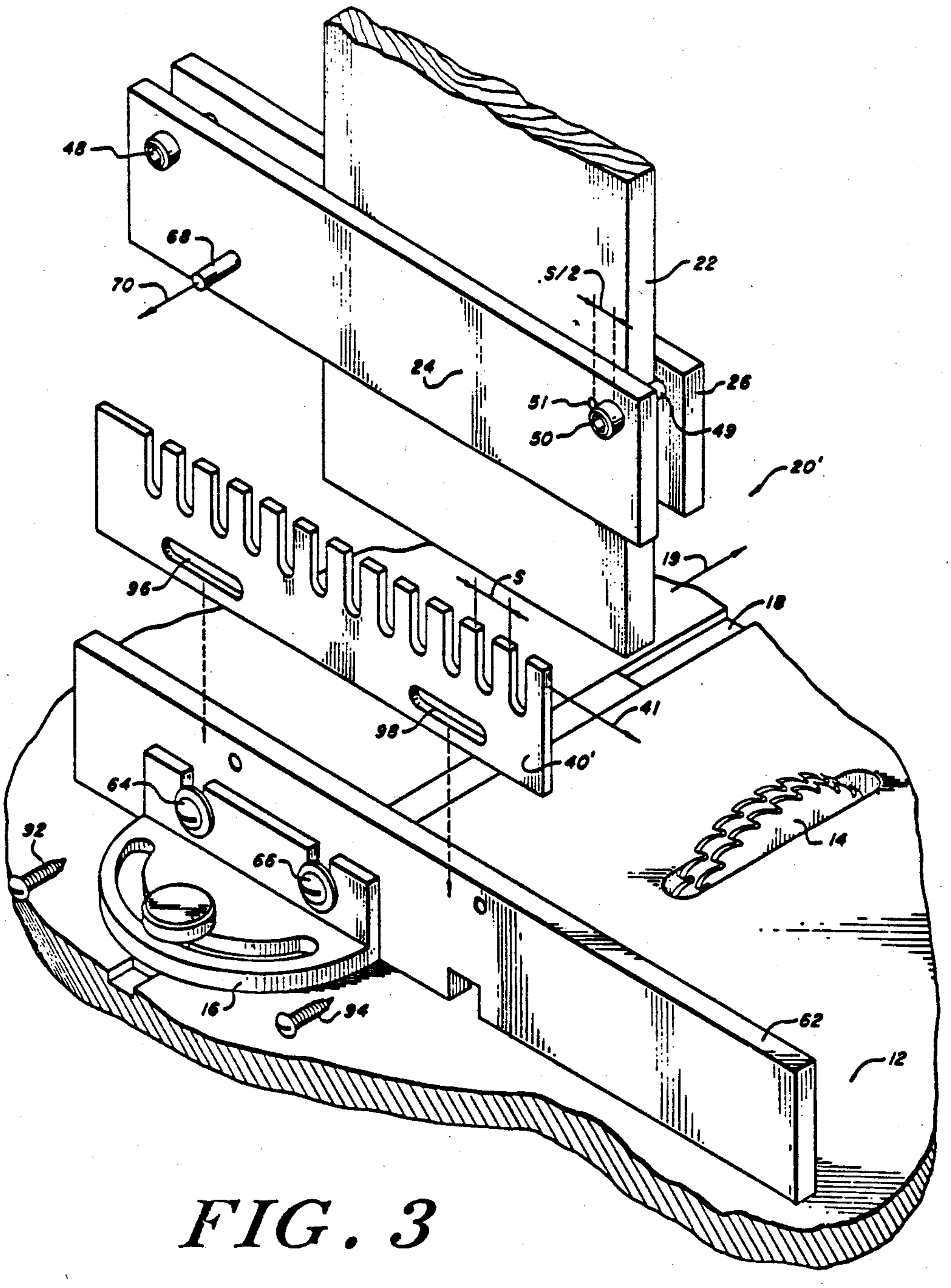
FIG. 3 shows in perspective view of another exemplary of the present invention and FIG. 4 shows another exemplary indexing member of the present invention.

FIG. 3 shows yet another embodiment of the present invention for use in conjunction with a table saw. In FIG. 3, elements corresponding to elements described in conjunction with FIG. 1 are identified with identical reference designations. The assembly 20′ in FIG. 3 includes a workpiece 22 configured with a clamping structure formed by a member 24 and member 26 held together by screw fastener assemblies 48 and 50. In FIG. 3, the bolt associated with fastener 50 provides the stop pin 49 in a similar manner to that shown in conjunction with FIG. 1. The member 24 has a pair of stop pin holes (including hole 51 and the hole through which fastener 50 extends) which are spaced apart by a distance S/2 in the direction of axis 41. The indexing pin 68 in the assembly 20′ extends from the surface of member 24 along the axis 70 which is parallel to the axis 19 in this embodiment, although angular offsets other than ninety degrees might also be used.

The assembly 20′ also includes a guide board 62 affixed to a miter gauge 16 by fasteners 64 and 66. In the embodiment of FIG. 3, the indexing member includes a single planar sheet element 40′ elongated in the direction of an indexing axis 41. The indexing element 40′ is attached to the front (as shown) surface of the board 62 by means of fasteners 92 and 94 through the slots 96 and 98, respectively, of member 40′, so that the hole portions extend above the top surface of guide board 62. Indexing member 40′ includes a plurality of holes uniformly spaced along the indexing axis 41 with an interhole spacing of S. In the preferred form of this embodiment, the member 24 has the same thickness as the guide board 62, and the pin 68 is located so that the clamping assembly for workpiece 22 may be successively positioned with pin 68 extending through ones of the holes of indexing member 40′ while the lower surface of workpiece 22 is flush with the surface 12 of the table saw.

With the configuration of FIG. 3, in operation, a first workpiece 22 may be held within the clamping structure as shown in FIG. 3 and a succession of finger holes cut in the workpiece by successively positioning the pin 68 in each of the adjacent holes of the indexing member 40′.

Thereafter, a second workpiece may be inserted into the clamping assembly formed by members 24 and 26 and fasteners 48 and 50, but with a stop pin inserted in hole 51 so that the resultant second workpiece is positioned within the clamping assembly in a manner displaced by S/2 with respect to the positioning of the first workpiece in that assembly. Thereafter, the cutting operations are performed on that second workpiece to achieve the complimentary fingers for the finger joint.

Figure 4:
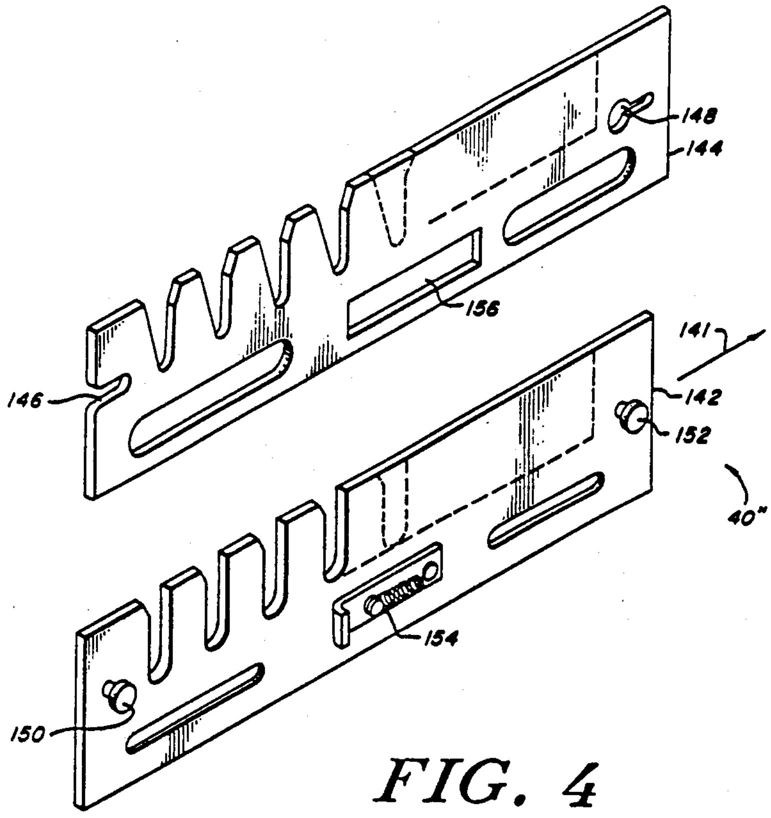

FIG. 4 shows another form of the indexing member of the embodiment FIG. 3. In FIG. 4, an indexing member 40″ includes a pair of elements 142 and 144. The elements 142 and 144 are spring biased in opposite directions. Element 144 is a template which is adapted to overlie element 142, where element 144 is positioned so that holes 146 and 148 are disposed about mounting studs 150 and 152 respectively, extending from element 144. A slide member 154 on member 142 is spring-biased to engage a slot 156 of member 144 so that member 144 is releasably held in place against member 142. Each of elements 142 and 144 include surfaces which together form a succession of equally spaced slots (or holes) along the indexing axis 141 of the element. In operation, the indexing member 40" functions in a manner similar to that described above in conjunction with indexing member 40'. As the clamped workpiece is repositioned along the indexing axis 141, an indexing pin displaces the spring-biased members 142 and 144 and rests in the hole formed by the respective notches of members 142 and 144.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for selectively positioning a workpiece having a planar surface adjacent to a guide on a substantially planar work surface, said guide being adapted for linear relative motion along a reference axis with respect to a cutting element, said reference axis being parallel to said work surface, said apparatus including means for selectively positioning said workpiece at selected ones of a plurality of predetermined lateral offsets with respect to said reference axis, comprising:

A. an indexing member including a first planar sheet portion having a plurality of index holes passing completely therethrough establishing a line-of-sight through each of said holes from one side of said portion tothe other, said index holes being disposed along an indexing axis with interhole separations along said indexing axis corresponding to said predetermined lateral offsets, B. an elongated index pin element extending along a pin axis, said pin element being adapted to fit through each of said index holes and interferingly engage said holes, C. means for affixing said indexing member to one of said workpiece and said guide, and means for affixing said index pin element to the other of said workpiece and said guide, whereby said workpiece may be positioned adjacent to said indexing member and said guide with said workpiece having the principal plane of said planar workpiece surface angularly offset with respect to said work surface and said pin element extending through and in inteferring engagement with one of said index holes, wherein said indexing member includes said first planar sheet portion and a second planar sheet portion, said first and second planar sheet portions being elongated in the direction of said indexing axis, said first and second planar sheet portions being offset by substantially ninety degrees and extending from a common axis parallel to said indexing axis, wherein said second portion being adapted for fixture to said workpiece, wherein said index pin element is adapted for fixture to said guide with said indexing axis being angularly offset with respect to said work surface, wherein said index holes are spaced uniformly along said index axis with an interhole spacing S, and wherein said second portion includes a plurality of workpiece stop pin holes passing therethrough along axes perpendicular to the principal plane of said second portion, wherein said stop pin holes are spaced apart by S/2 in the direction of said indexing axis and are adapted to permit passage of a stop member therethrough.

2. Apparatus according to claim 1 further comprising a template member adapted for releasable attachment to said indexing member, said template member having at least an elongated first portion extending along a template axis, and having a plurality of template holes passing therethrough along said template axis, said template holes being uniformly spaced along said template axis with an interhole spacing of rS, where r is an integer, said template member being adapted whereby said template axis is parallel to said indexing axis and said template holes overlie ones of said index holes when said template member is attached to said first portion.

3. Apparatus according to claim 2 wherein said template member further includes a second portion adapted to overlie said second portion of said index member when said template member is attached to said index member, said second portion of said template member including at least two stop pin holes passing therethrough and being adapted to overlie two holes of said workpiece stop pin holes of said second portion of said indexing member which are spaced apart by rS/2.

4. Apparatus according to claim 1 wherein said indexing member includes two overlapping and adjacent planar sheet index portions elongated in the direction of said indexing axis, each of said index portions including a plurality of reference holes passing therethrough, said reference holes of each index portion being disposed along said indexing axis with interhole separations along said indexing axis corresponding to said predetermined lateral offsets, and further including means for biasing said index portions in oposite directions along said indexing axis whereby overlapping pairs of said reference holes define corresponding ones of said index holes, each of said index holes having a variable width which is a function of forces applied to said portions in opposition to the force established by said biasing means.

5. Apparatus according to claim 1 wherein said index member includes an edge extending substantially parallel to said indexing axis, and wherein said index holes are open ended slots extending from said edge.

6. Apparatus for selectively positioning a workpiece having a planar surface adjacent to a guide on a substantially planar work surface, said guide being adapted for linear relative motion along a reference axis with respect to a cutting element, said reference axis being parallel to said work surface, said apparatus including means for selectively positioning said workpiece at selected one of a plurality of predetermined lateral offsets with respect to said reference axis, comprising:

A. an indexing member including a first planar sheet portion having a plurality of index holes passing completely therethrough establishing a line-of-sight through each of said holes from one side of said portion to the other, said index holes being disposed along an indexing axis with interhole separations along said indexing axis corresponding to said predetermined lateral offsets, B. an elongated index pin element extending along a pin axis, said pin element being adapted to fit through each of said index holes and interferingly engage said holes, C. means for affixing said indexing member to one of said workpiece and said guide, and means for affixing said index pin element to the other of said workpiece and said guide, whereby said workpiece may be positioned adjacent to said indexing member and said guide with said workpiece having the principal plane of said planar workpiece surface angularly offset with respect to said work surface and said pin element extending through and in interfering engagement with one of said index holes, wherein said indexing member includes a planar sheet element elongated in the direction of said indexing axis, said indexing member being adapted for fixture to said guide with the principal plane of said indexing member being perpendicular to said work surface, and wherein said index pin element is adapted for fixture to said workpiece with said indexing axis being perpendicular to the principal plane of said workpiece wherein said index holes are spaced uniformly along said index axis with an interhole spacing S wherein said means for affixing said index pin element to said workpiece includes a clamp assembly having a pair of opposed planar sheet elements adapted to support each side of said workpiece and wherein said index pin element is affixed to one of said clamp assembly elements with said indexing axis extending perpendicular to said one clamp assembly element wherein said one sheet element includes a plurality of workpiece stop pin holes passing therethrough along axes perpendicular to the principal plane of said one sheet element, wherein said stop pin holes are spaced apart by a distance S/2 and are adapted for the passage of a stop member therethrough.

7. Apparatus according to claim 6 wherein said means for affixing said indexing member to said guide includes a plurality of mounting holes passing through said indexing member along axes perpendicular to the principal plane of said indexing member, and associated screw fastening means adapted to pass through said mounting holes for affixing said indexing member to said guide.

* * * * *